Dec. 22, 1959   H. EPSTEIN   2,918,652
VEHICLE SPEED INDICATING DEVICE
Filed May 11, 1959

INVENTOR.
HARRY EPSTEIN
BY *John P. Chandler*
HIS ATTORNEY.

United States Patent Office 2,918,652
Patented Dec. 22, 1959

2,918,652

VEHICLE SPEED INDICATING DEVICE

Harry Epstein, Rochelle Park, N.J., assignor to Kleff Products, Inc., New York, N.Y., a corporation of New York Application May 11, 1959, Serial No. 812,228

5 Claims. (Cl. 340—52)

This invention relates to speed sensing and indicating devices for vehicles and relates more particularly to a novel alarm system which can be manually set to a predetermined speed by the operator of the car which will actuate an audible or visible warning element plus a second sensory warning element if the first one should be disregarded.

An important object of the invention is to provide an inexpensive speed alarm system for vehicles which can be installed on the vehicle by a person of average skill in a matter of minutes.

Another object of the invention is to provide a speed indicator having a plurality of warning elements which successively react on the senses of the operator so that if the first signal is ignored or does not strike the attention of the driver, the second element in all events will do so since to disregard this requires greater manual effort to depress the accelerator pedal and maintain the vehicle at the unwanted speed.

In accordance with the invention a normally open electrical switch with a spring urged plunger type of contact is mounted on the throttle control rod with its plunger extending rearwardly and connected to an adjustable flexible control cable with two linkage elements arranged in series between the plunger and the forward end of the control cable whose position is controlled by a handle on the instrument panel. One of the linkage elements is a coiled spring whose resistance to elongation is greater than the spring resisting rearward travel of the plunger in the switch. The second linkage element may be a short length of chain which normally is not elongated to its full length but rather has a catenary curve between its ends.

The switch controls the closing of a circuit including a light on the panel or an audible alarm. When the vehicle starts operation the cable wire will be in its maximum forward position. Assuming a maximum speed of 50 miles per hour is desired, the operator accelerates the car until the speedometer reads 50 and he then draws the cable rearwardly until the panel light is lighted which is achieved when the chain straightens out under a tension pull and forward movement of the throttle control rod causes the plunger in the switch to move rearwardly and close the switch and the light circuit controlled thereby. This much of the operation could be achieved even if the spring were omitted from the linkage.

If the light should be ignored and the speed increased over the 50-mile speed, the further forward movement of the accelerator pedal and throttle control rod required to produce the increased speed is resisted by the spring linkage element, and the operator being accustomed to the normal pressure required to depress the accelerator will be forcibly reminded that his speed is too great.

Figure 1:
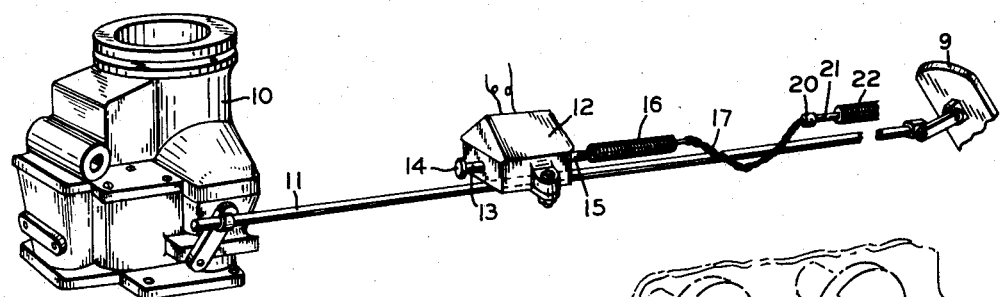
Fig. 1 is a perspective view showing the principal operating components in the combination of the present invention.
Figure 2:
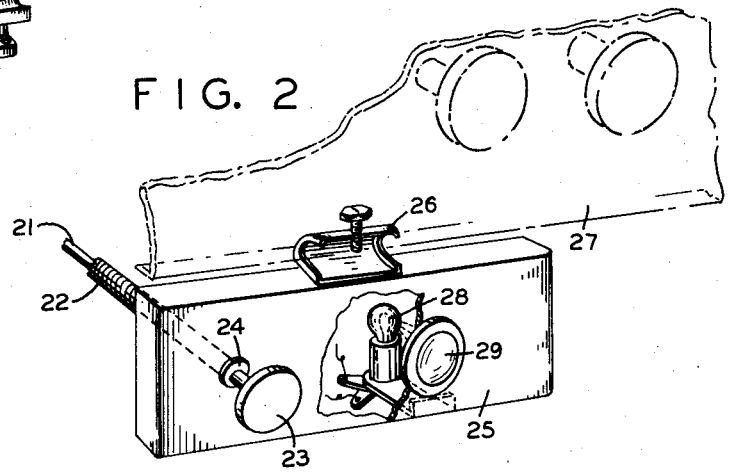
Fig. 2 is a perspective view of the elements mounted on the car instrument panel.

The components of the combination of the present invention are illustrated in Fig. 1 wherein the carburetor is shown at 10 and the throttle control rod at 11, said rod being operatively connected with the usual foot accelerator pedal 9. Secured as by means of a clamping element to said rod is a normally open, spring urged switch 12 which forms a part of the speed sensing unit. A plunger 13 within the switch housing is normally urged to the right, when viewed as in Fig. 1, by means of an internal spring (not shown).

The plunger has a head 14 limiting movement to the right, and the right hand end 15 of the plunger has a hole which receives one end of a coiled spring 16. A short flexible link such as a chain 17 is connected with the opposite end of spring 16 and the free end of the chain is connected with a hook-shaped terminal 20 of a flexible transmission cable wire 21 movable in a flexible cable conduit 22.

At its rear end the transmission wire 21 is secured to a handle 23 and at this end the cable conduit has a bushing 24 which is secured in fixed relation to a block 25 which is mounted on the car instrument panel by means of a bracket 26 carried on the instrument panel 27 of the vehicle. This bracket also supports a signal light 28 which is visible through a small colored lens 29.

Figure 3:
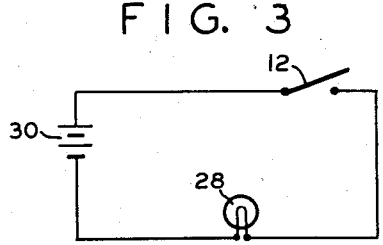
Fig. 3 is a circuit arrangement.

The circuit shown in Fig. 3 shows the light 27, the switch 15 and the source of electrical energy which may be the car storage battery 30.

Figure 4:
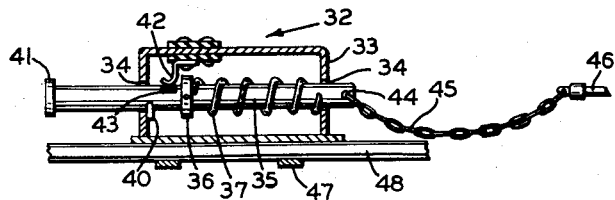
Fig. 4 shows a modified arrangement.

In the modified arrangement of Fig. 4 the external spring 16 is eliminated and a slightly different type of switch, shown at 32, is employed. This switch has a housing 33 whose opposed end walls have aligned openings 34 forming bearing elements for supporting a contact plunger 35 for sliding movement. This plunger has a fixed ring 36 engaged by one end of a coiled compression spring 37, the other end bearing against the opposite wall of the housing.

A stop 40 limits travel of the plunger to the left and a head 41 limits travel to the right. A spring contact 42 engages an insulating block 43 when the parts are in the position of Fig. 4. The opposite end of the plunger has a hole 44 which receives one end of chain 45, the opposite end of which is connected with the flexible wire transmission cable 46. Straps 47 connect the switch with the throttle control rod 48.

The operation is substantially the same as with the first embodiment. Although the switch has a longer stroke the circuit is closed after the first small increment of travel, say 3/16 inch. The resistance of the spring to compression increases progressively as its effective length is reduced, so the resistance to the last 1/4 inch of travel is greater than the first 1/4 inch of travel, so the action is substantially the same as with the switch 12 of shorter stroke and spring resistance therein of lesser magnitude than that of external spring 16.

After the first quarter inch of travel of the plunger the lamp circuit is closed and further depression of the accelerator pedal causes increased resistance by the spring.

While there have been described herein what are at present considered preferred embodiments of the invention, it will be obvious to those skilled in the art that many modifications and changes may be made therein without departing from the essence of the invention. It

What I claim is:

1. The combination with a vehicle having a throttle control rod actuated by a foot accelerator, of a speed sensing device which is provided with a plurality of speed indicating elements, said device comprising a normally open switch mounted on said control rod and provided with a spring-urged plunger type of contact extending rearwardly of the vehicle, an adjustable control cable extending forwardly from the instrument panel, and a flexible linkage element connecting the forward end of the control cable with the rear end of the plunger, said element being normally free from tension and having a caternary curve between its ends, and a circuit including one of said speed indicating elements and said switch, the increased resistance to depression of the accelerator as a result of the plunger spring forming another of said indicating elements.

2. A combination with a vehicle having a throttle control rod actuated by a foot accelerator, of a speed sensing device which is provided with a plurality of speed indicating elements including a sensory device such as a light or a bell, said device comprising a normally open switch mounted on said control rod and provided with a spring-urged plunger type of contact extending rearwardly of the vehicle, an adjustable control cable extending forwardly from the instrument panel, and two linkage elements arranged in series connecting the forward end of the cable wire with the rear end of the plunger, said elements comprising a spring and a chain which is normally not under tension and has a catenary curve between its ends, and a circuit including the sensory device and the switch.

3. A combination with a vehicle having a throttle control rod actuated by a foot accelerator, of a speed sensing device which is provided with a plurality of speed indicating elements, said device comprising a normally open switch mounted on said control rod and provided with a spring-urged plunger type of contact extending rearwardly of the vehicle, an adjustable control cable extending forwardly from the instrument panel, and two linkage elements arranged in series connecting the forward end of the cable wire with the rear end of the plunger, said elements including a tension spring having a resistance to elongation greater than the capacity of the plunger spring, and a chain which is normally not under tension and has a catenary curve between its ends, and a circuit including the switch and one of the speed indicating elements, the tension spring which increases the resistance of the accelerator constituting the other speed indicating element.

4. The combination of a vehicle having a throttle control rod actuated by a foot accelerator, of a speed sensing device which is provided with a plurality of speed indicating elements, said device comprising a normally open switch mounted on said control rod and provided with a spring-urged plunger type of contact extending rearwardly of the vehicle, an adjustable cable wire extending forwardly from the instrument panel, and a plurality of linkage elements arranged in series connecting the forward end of the cable wire with the rear end of the plunger, said elements including a spring having a resistance to elongation greater than the capacity of the plunger spring, and a chain which is normally free from tension and has a catenary curve between its ends.

5. A combination with a vehicle having a throttle control rod actuated by a foot accelerator, of a speed sensing device which is provided with a plurality of speed indicating elements, said device comprising a normally open switch mounted on said control rod and provided with a spring-urged plunger type of contact extending rearwardly of the vehicle, said switch being arranged to be closed after a short increment of travel and the spring increasing its resistance as its travel increases, an adjustable control cable extending forwardly from the instrument panel, and a flexible element connecting the forward end of the cable wire with the rear end of the plunger, said element comprising a chain which is normally free from tension and has a catenary curve between its ends, and a circuit including one of said sensory elements and the switch.

No references cited.